US005741578A

United States Patent [19]

Sax

[11] Patent Number: 5,741,578

[45] Date of Patent: Apr. 21, 1998

[54] ARTWORK COMPRISING OVERLYING IMAGES

[76] Inventor: Sandra D. Sax, 7285 Rogers St., Las Vegas, Nev. 89118

[21] Appl. No.: 633,923

[22] Filed: Apr. 17, 1996

Related U.S. Application Data

[63] Continuation-in-part of Ser. No. 259,781, Jun. 14, 1994, abandoned.

[51] Int. Cl.[6] .......... B32B 7/02

[52] U.S. Cl. .......... 428/212; 40/615; 283/91; 283/92; 283/109; 283/111; 427/265; 428/303; 428/912.2

[58] Field of Search .......... 427/265, 282; 40/615; 283/91, 92, 109, 111; 428/212, 303, 912.2

[56] References Cited

U.S. PATENT DOCUMENTS

| | | | |
|---|---|---|---|
| 267,284 | 11/1882 | Trotter, Jr. . | |
| 2,555,505 | 6/1951 | Plumbo | 41/21 |
| 2,827,720 | 3/1958 | Phillippi | 40/137 |
| 3,225,457 | 12/1965 | Schure | 35/9 |
| 3,589,045 | 6/1971 | Rakowsky | 40/106.5 |
| 3,943,648 | 3/1976 | Sterne | 40/106.51 |
| 4,627,642 | 12/1986 | Peronneau et al. | 283/92 |
| 5,407,711 | 4/1995 | Lovison et al. | 427/265 X |

*Primary Examiner*—Michael Lusignan
*Attorney, Agent, or Firm*—Quirk & Tratos

[57] ABSTRACT

A method is provided for creating artwork which comprises a second image which is located in direct overlying relation to a first image. In particular, the method includes providing a first image such as a print, having a first reflective quality. A substantially transparent coating, having a reflectivity substantially different than the reflectivity of the first image, is selectively disposed over the first image. The method provides artwork having a first image visible through the transparent coating which is used to create the second image. A separate reflected image is created as a result of the differences in reflective characteristics between the first and second images.

26 Claims, 1 Drawing Sheet

ARTWORK COMPRISING OVERLYING IMAGES

CROSS REFERENCE TO RELATED APPLICATION

This application is a continuation-in-part application of application Ser. No. 08/259,781, filed Jun. 14, 1994 now abandoned, and owned by the Applicant herein.

FIELD OF THE INVENTION

The present invention relates to a method for producing artwork and products produced thereby. In particular, the present invention relates to a method for creating essentially two-dimensional artwork having a first image and an overlying, substantially transparent, second image having first and second reflective characteristics whereby the two images, particularly when the artwork is viewed from an angle of reflection, can be seen.

BACKGROUND OF THE INVENTION

Artwork, and methods for creating the same, is constantly being developed in order to satisfy the desires of individual artists, businesses, and the viewing public for both commercial and purely aesthetic purposes.

One type of artwork, which has been explored and which takes a three-dimensional approach, comprises more than one image, particularly, artwork where a second image is placed over a base work. For example, in U.S. Pat. No. 3,943,648 a method is disclosed for placing a Fresnelled lens sign display having a visible printed message thereon in front of a background display. The result provides a first visual image (the message) superimposed on the background image to passersby. This technique is not suitable for production using well known printing methods and is unsuitable for certain applications where substantial two-dimensionality is desired.

Another type of display is described in U.S. Pat. No. 2,827,720 where glass beads suspended in an adhesive are adhered over a static display. This work displays the animated, i.e. reflected image from the glass beads when the observer is in front of the static display. Again, this technique is not suitable to mass production methods such as printing and exhibits a substantial thickness dimension by virtue of the beads and adhesive. Still further, the ridgid adhesive and beads are not suitable for use with a flexible backing material. Using this technique on flexible paper stock or subjecting the work to pass over print rollers or the like would crack and dislodge the adhesive-glass bead layer.

It is also known to print a second solid image directly over a first image. For example, a photograph may be printed, and a second image, e.g. directional arrows, writing or other images may be printed directly over the first image. Such methods result in the first image being obscured to some degree.

There is, therefore, a need to provide methods for producing an artwork, such as an advertising display, which provides for the viewing of a background image and an overlying image, which results in a work which is substantially two-dimensional so as to usable for a wide variety of applications and which can be manufactured by conventional processes such as lithography or serigraphy for mass production of the artwork. There is also a need for artwork produced by these methods.

SUMMARY OF THE INVENTION

Toward this end, there is provided a method for fashioning substantially two-dimensional artwork having a first image and a substantially transparent, but visible, second image, the second image particularly visible in reflected light. There is also provided a method which is compatible with mass imprinting processes such as lithography and serigraphy for manufacturing the artwork. Still further there is provided artwork produced by the method.

Accordingly, the method, according to the present invention, includes providing a first image on a substrate, the first image exhibiting a first reflective characteristic and being substantially two dimensional, i.e. having substantially no thickness. For example, the first image may be a photographic print of the Grand Canyon imprinted on paper stock and having a matte finish, i.e. dull or low reflective characteristic. The first image will have a height and width but substantially no thickness in that said thickness will only be imparted by a thin layer of ink. A second image is deposited over the first by imprinting, for example. The second image is substantially transparent to not interfere with the complete viewing of the base image and exhibits a second reflective characteristic different from the first reflective characteristic. The second image may be, for example, a glossy representation of an eagle with wings spread. The second image is likewise substantially two-dimensional, exhibiting only a thickness defined by the thickness of the layer defining the second image. Viewing the artwork, the observer sees the first image, the Grand Canyon, clearly. However, when the observer views the artwork from an angle where the second image reflects light incident upon the artwork, the second image, the eagle, surprisingly appears as a reflection. Where the artwork is a two-dimensional poster on a wall, the viewer walking past the poster may see only a flashes of the reflected image, as the viewer passes through the angles of reflection. This flash of an image will draw the viewer's attention to the poster and message imprinted thereon.

In one specific embodiment, the method, according to the present invention, includes imprinting the first image as well as the second image on a suitable substrate such as paper or cardboard stock. The first image, by selection of the inks or application of a coating, is substantially two-dimensional and exhibits a first reflective characteristic. This characteristic may be dull, i.e. matte, or glossy. The first image, is the image intended to be viewed at all times. Over the first image there is imprinted, as by serigraphy, for example, a transparent, substantially two-dimensional second image having a second reflective characteristic. For example, where the first image has a dull finish, the second image may have a glossy, highly reflective characteristic. Where the first image has a glossy, highly reflective characteristic, the second image may be dull and configured to overlay all portions of the first image except those desired to create a reflecting image.

The artwork produced, according to the method, provides for the viewing of both the base and reflecting images, the reflecting image particularly evident when reflecting light. Furthermore, the methods according to the present invention, are susceptible to mass producing the artwork since they can be incorporated into printing processes such as serigraphy. Accordingly, prints may be mass produced.

By providing substantially two-dimensional first and second or reflected images the artwork can conveniently be a poster, postcard, greeting card, playing card or the like. Use of products such as these would be encumbered by a substantial thickness.

The differences in the first and second reflectivities can be obtained through the use of transparent varnishes, inks and coatings such as UV coatings, including, plastic, acrylic, silicon or other photo-polymers deposited as a liquid film and cured.

As a further advantage, the method, according to the present invention, is suitable for use with flexible substrates such as paper stock, cardboard, clothing or the like, since the images are not ridged as would be created through the use of glass beads suspended in an adhesive.

Further objects, features, and advantages of the present invention will become apparent from the detailed description of the drawings which follows when considered with the attached figures.

DETAILED DESCRIPTION OF THE PREFERRED EMBODIMENT

Figure 1:
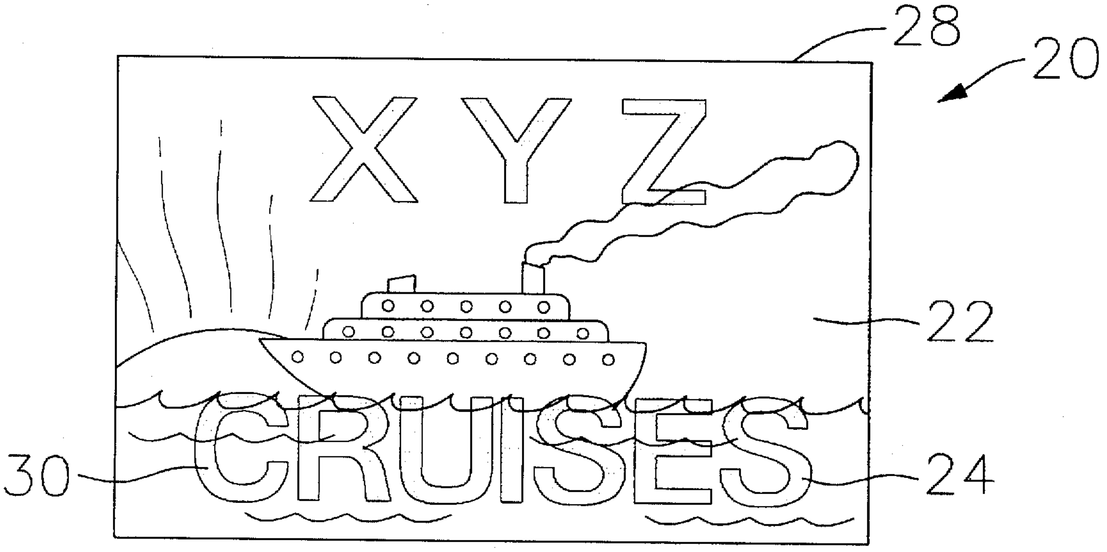
FIG. 1 illustrates a first version of artwork created with the method of the present invention.
Figure 2:
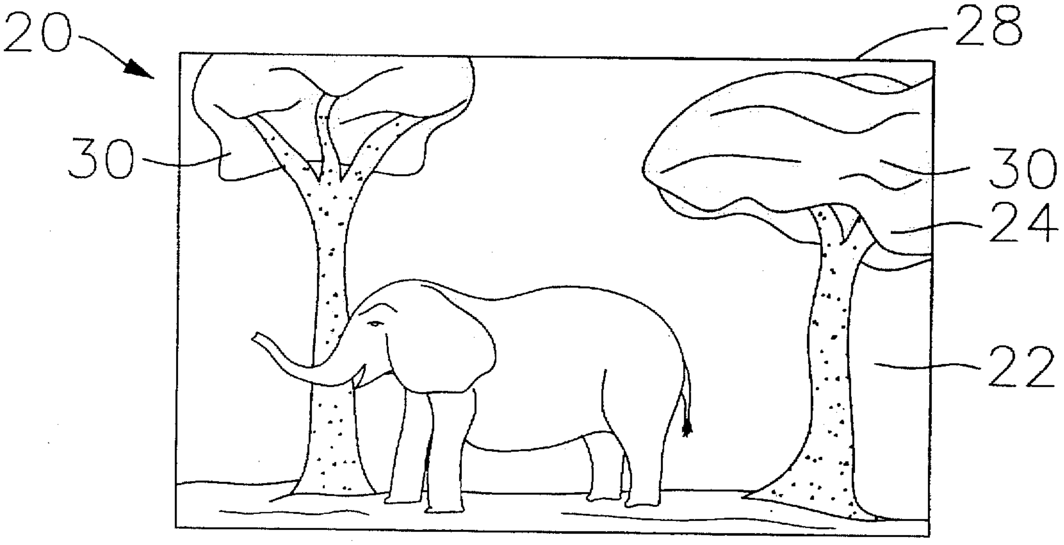
FIG. 2 illustrates a second version of artwork created with the method of the present invention.

FIGS. 1 and 2 illustrate an artwork design 20, created in accordance with the method disclosed herein. In general, artwork 20, created in accordance with the method of the present invention, comprises a second image 24 which is disposed on a first or base image 22.

The underlying first image 22 is substantially two-dimensional and may comprise any of a number of artistic works or designs. In particular, the image 22 may comprise a painting, or more preferably, a print. The image 22 may also comprise a photographic or other similar work. When in the form of a painting, the image 22 is produced by painting or coloring a substrate or backing 28. The backing 28 may be canvas, paper, cardboard, a textile material or other support material known to those skilled in the art. Further, the backing may be flexible.

Preferably, the first image 22 is produced via a machine-produced printing process. In printed forth, the backing 28 is preferably paper or other similarly smooth backing material but can be cardboard or a textile material such as a T-shirt. In the most preferred form, the backing 28 used is a paper material, and the first image 22 is placed thereon using a lithography process, and most preferably a serigraphy (otherwise known as silk screening) process, although use of other processes known to those skilled in the art are acceptable. The lithographic and serigraphic printing methods are conventional. As can be appreciated, the first image 22 is substantially two-dimensional. Any thickness is created only by a thin layer if ink or other similar media such as pencil tracing, water colors, photographic print pigments or the like.

The first image 22, located on the backing 28, may be of any form or shape which the creator thereof desires. For example, as illustrated in FIG. 1, the first image 22 depicts a ship on the ocean, while in FIG. 2, the first image 22 is an elephant with a background. As another example, the first image may be a photographic print of the Grand Canyon. These are but a few examples in that the method may be used in more commercial contexts such as greeting cards, business cards, posters, playing cards or the like.

The first image 22 exhibits not only the image but a first reflective characteristic. For example, by using appropriate inks or coating(s), the first image may have a low reflectivity, i.e. be dull as by having a matte finish. Alternatively, where it is desired to have the first image 22 exhibit a higher reflective characteristic, inks or varnish coatings may be selected. Alternatively, a UV coating selected from plastic, acrylic, silicon or other photo-polymers may be used. It is to be understood that the application of a selected coating will not contribute a significant thickness dimension to the first image 22.

In addition to providing the first image 22, having first selected reflective characteristic, the method, according to the present invention, includes depositing, as by lithographical or serigraphical imprinting, a second image 24. The second image 24 is substantially transparent and has a second reflective characteristic. For example, if the first image 22 in FIG. 1 has a dull reflective characteristic, the second image 24 will have a higher reflective characteristic such as a glossy finish. In this embodiment the second image 24 also defines a reflecting image 30.

However, where the first image 22 has a reflective characteristic higher than the second image 24, the layer defining the second image 24 will be deposited as a negative image, i.e. will cover the first image 22 except in those areas which will represent the reflecting image 30. With reference to FIG. 1, in this instance, the layer defining the second image 24 would cover the entirety of the first image 22 except in those areas spelling out the reflecting image 30 "XYZ CRUISES".

Once the first image 22 is fixed on the backing 28, the transparent, second image 24 is preferably placed directly over the first image 22. The second image 24 is substantially two-dimensional and has a second reflective characteristic, different from the first reflective characteristic. The second image 24 is placed directly onto the material on which the first image 22 is printed. As stated above, if the first reflective characteristic of the first image 22 is relatively high, i.e. glossy and reflective, the second image 24 is created by placing a substantially transparent and dull, non-reflective finish over portions of the first image 22, leaving uncovered the desired reflecting image 30. The reflecting image 30 thus appears in those areas which are left glossy or "reflective." Conversely, where the first image 22 has a relatively low reflective characteristic such as by being dull and non-reflective, the second image 24 as well as the reflecting image 30 are created by placing a transparent and reflective material on the first image 22 in the shape of the desired reflecting image 30.

In any case, the substantive form of the reflecting image 30 is created by the differences in the reflectivities between the first and second images 22, 24. This is true whether the differences in reflectivity are created by overlaying a transparent reflective material on a dull first image 22, or a dull material on a glossy first image 22. In either instance, the reflecting image 30 becomes clearly visible via the differences in reflected light from the artwork 20.

Based upon the nature of the material defining the second image 24, when deposited over the first image the colors of the first image 22 may become somewhat darker. For example if the first image 22 is a photographic print and the second image 24 is defined by depositing a clear ink varnish, in those areas where the ink varnish is applied the colors of the first image 22 may become slightly deeper. While the deepening of the colors may be evident upon close inspection, the nature of the reflecting image 30 will not be clearly ascertainable until the light is reflected thereby.

When the art work 20 produced, according to the method of the present invention, is viewed from in front of the work 20, all the viewer will typically see is the first image 22. The reflecting image 30 will be hidden. However, when the viewer moves to a position where incident light on the work 20 is reflected by the reflecting image 30 created by the interaction of the first and second images 22, 24, light is reflected and the reflecting image 30 become clearly apparent.

Moving out of the position to receive the reflection, the reflecting image 30 is lost to the viewer.

Of course, in other variations, the entire first image 22 may be coated with a dull, non-reflective material, and then a glossy, reflective second image 24 may be placed over it to create the reflecting image 30. Also, the entire first image 22 may be coated with a glossy material, and then have the reflecting image 30 created by placing a dull, second image 24 over the first image 22 in selective areas.

Whichever of the first or second images 22, 24 is to have the higher reflective characteristic, that characteristic may be imparted by a high gloss varnish of the type available from Inks International of Chicago, Ill., deposited by printing, spraying, or other application means. Alternatively, the reflective characteristic may be fashioned by selectively depositing a ultraviolet (UV) reflective coating such as plastic, acrylic, silicon or other photo-polymers deposited as a liquid film in a thickness ranging from about 0.75 to 1.75 mm. Thereafter, as is known in the art of UV coatings, the deposited film is cured under UV light. The preferred method for placing the material is by printing, preferably by a serigraphic or lithographic process.

The appearance and locations where the reflecting image 30 appears may be altered by providing a plurality of incident light sources striking the artwork from various angles. Further, these light sources may be assigned different color frequencies so that, depending upon the position of the viewer, the reflected image 30 will appear as different colors.

With reference to FIG. 1, a product produced by one embodiment of the present invention is shown. The first image 22 of a vessel on the high seas is provided with a dull, or matte, reflective characteristic. The transparent, second image 24 is deposited over the first image 22, as by serigraphy in the form of lettering "XYZ CRUISES". This second image 24 has a glossy, second reflective characteristic and accordingly also defines the reflecting image 30.

When viewed from most angles, the viewer sees only the first image 22, the cruise vessel on the ocean. However, when the viewer is positioned at the angle of reflection of incident light off of the reflecting image 30, the reflecting image 30 appears. The angles at which the reflected image 30 appears and the color of the image can be altered by arrangement of lighting relative to the artwork 20.

With reference to FIG. 2, a product fashioned according to another embodiment of the present invention, is shown. According to this embodiment, the first image 22 of an elephant and background is provided on a substrate backing 28. According to this embodiment, the first image 22 has a glossy, reflective characteristic which may be imparted by the print media, ink, or can be provided by an overall clear glossy coating. A transparent second image 24 is deposited over the first image 22 and has a second reflective characteristic as by being dull or matte. In this embodiment, the second image 24 is deposited by serigraphy, for example, as a negative image relative to the desired reflecting image 30. Accordingly, where the desired reflecting image 30 is trees to either side of the elephant, the second image 24, having a dull reflective characteristic, is deposited over the first image 22 except for the areas defining the trees. The glossy characteristic of the first image 22 is left uncovered, and when viewed from the angle(s) of reflection of incident light, clearly reveals the reflecting image 30 of the trees.

As can be appreciated, the methods and products produced by those methods provide artwork which is substantially two dimensional and provides for having two images. Unlike a technique involving the application of adhesives and glass beads, the methods and products of my invention can be produced in mass quantities by known printing techniques, can be produced on flexible substrates and are not encumbered by having a substantial thickness dimension. For example, playing cards could be produced according to this method to provide the first image, for example the face of the card such as a queen of hearts, and the reflecting image could be a logo for the manufacturer. The cards could be shuffled, bent and dealt without destroying the presentation of the first and reflecting images.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A method for creating an artwork having overlaying images comprising:

providing a first image on a flexible, opaque substrate, said first image exhibiting a first reflective characteristic;

depositing a second image over the first image, said second image being transparent and exhibiting a second reflective characteristic, the artwork being viewed from an angle of reflection relative to the artwork revealing said second image.

2. The method of claim 1 wherein the first reflective characteristic is dull relative to the second reflective characteristic.

3. The method of claim 1 wherein the second reflective characteristic is dull relative to the first reflective characteristic.

4. The method of claim 3 wherein the first image exhibits a low reflectivity, the method further including the step of coating the first image with a liquid and allowing the liquid to solidify to define said first reflective characteristic and thereafter depositing the second image.

5. The method of claim 1 wherein the second image is imprinted by serigraphy.

6. The method of claim 1 wherein the second image is imprinted by selectively depositing as a liquid an ultraviolet reflective film and further including the step of allowing the film to solidify.

7. The method of claim 6 wherein the film is deposited in a thickness of between 0.75 mm and 1.75 mm.

8. The method of claim 6 wherein the film is cured under ultraviolet light.

9. The method of claim 1 wherein the second image is imprinted by selectively depositing as a liquid a compound selected from the group of ultraviolet coatings, plastic photopolymers, acrylic polymers, silicon polymers or varnishes and further includes the step of allowing the liquid to solidify.

10. The method of claim 1 wherein the first and second images are substantially two-dimensional.

11. A product produced according to the method of claim 1.

12. A method for creating artwork having a hidden reflecting image comprising:

providing a first image on an opaque substrate, said first image exhibiting a first reflective characteristic;

depositing as a liquid film in selected locations over the first image a second image, the film when solidified being transparent and exhibiting a second reflective characteristic, the artwork being viewed in ambient light and at angles of reflection revealing the second image.

13. The method of claim 12 wherein the first reflective characteristic is dull relative to the second reflective characteristic.

14. The method of claim 12 wherein the second reflective characteristic is dull relative to the first reflective characteristic.

15. The method of claim 12 wherein the second image in imprinted by serigraphy.

16. The method of claim 12 wherein the second image is depositing as a liquid ultraviolet film and further includes the step of allowing the film to solidify.

17. The method of claim 16 wherein the film is deposited in a thickness of between 0.75 mm and 1.75 mm.

18. The method of claim 16 wherein the film is solidified under ultraviolet light.

19. The method of claim 12 wherein the film is a transparent varnish.

20. The method of claim 12 wherein the second image is depositing as a liquid compound selected from the group of ultraviolet coatings, plastic photopolymers, acrylic polymers, silicon polymers or varnishes and further includes the step of allowing the liquid to solidify.

21. The method of claim 12 wherein the first and second images are substantially two-dimensional.

22. A product produced according to the method of claim 12.

23. A method for producing artwork comprising:

printing a first image on an opaque substrate, said image having a first reflective characteristic:

depositing a second, transparent image on top of the first image having a second reflective characteristic, said second image adapted to reflect light to become visible when viewing the artwork from and angle of reflection.

24. The method of claim 23 wherein the first reflective characteristic is dull relative to the second reflective characteristic.

25. The method of claim 23 wherein the first reflective characteristic is glossy relative to the second reflective characteristic.

26. A product produced according to the method of claim 23.

* * * * *